(12) United States Patent
Guo

(10) Patent No.: US 11,526,233 B2
(45) Date of Patent: Dec. 13, 2022

(54) METHOD FOR CONTROLLING TOUCH SCREEN, APPARATUS AND DEVICE, STORAGE MEDIUM AND PROCESSOR

(71) Applicants: Analogix (China) Semiconductor, Inc., Beijing (CN); ANALOGIX INTERNATIONAL LLC, Wilmington, DE (US)

(72) Inventor: Chuncheng Guo, Beijing (CN)

(73) Assignees: ANALOGIX (CHINA) SEMICONDUCTOR, INC, Beijing (CN); ANALOGIX INTERNATIONAL LLC, Wilmington, DE (US)

(*) Notice: Subject to any disclaimer, the term of this patent is extended or adjusted under 35 U.S.C. 154(b) by 104 days.

(21) Appl. No.: 17/264,346

(22) PCT Filed: Aug. 23, 2018

(86) PCT No.: PCT/CN2018/104153
§ 371 (c)(1),
(2) Date: Jan. 29, 2021

(87) PCT Pub. No.: WO2020/037715
PCT Pub. Date: Feb. 27, 2020

(65) Prior Publication Data
US 2021/0165549 A1    Jun. 3, 2021

(30) Foreign Application Priority Data

Aug. 23, 2018   (CN) .......................... 201810967720.3

(51) Int. Cl.
*G06F 3/041* (2006.01)

(52) U.S. Cl.
CPC ................................ *G06F 3/04166* (2019.05)

(58) Field of Classification Search
None
See application file for complete search history.

(56) References Cited

U.S. PATENT DOCUMENTS

| | | | |
|---|---|---|---|
| 10,282,022 B2 | 5/2019 | Li | |
| 2014/0184539 A1* | 7/2014 | Shin | G06F 3/041661 345/173 |

(Continued)

FOREIGN PATENT DOCUMENTS

| | | |
|---|---|---|
| CN | 101339450 A | 1/2009 |
| CN | 101957507 A | 1/2011 |

(Continued)

OTHER PUBLICATIONS

International Search Report for corresponding application PCT/CN2018/104153 filed Sep. 5, 2018; dated May 22, 2019.

*Primary Examiner* — Krishna P Neupane
(74) *Attorney, Agent, or Firm* — Cantor Colburn LLP

(57) ABSTRACT

A method for controlling touch screen, apparatus and device, a storage medium and a processor are provided, the method including that: a detection result is acquired, the detection result is used for representing whether a touch behavior over a touch panel of a touch screen exists; a feedback signal is determined according to the detection result; and a working mode of the touch screen is controlled according to the feedback signal.

12 Claims, 4 Drawing Sheets

(56) References Cited

U.S. PATENT DOCUMENTS

2014/0285464 A1* 9/2014 Mo ..................... G09G 3/3648
                                                          345/87
2017/0277318 A1* 9/2017 Wang ................... G09G 3/2092
2019/0384445 A1* 12/2019 Huang ................. H01L 27/323

FOREIGN PATENT DOCUMENTS

| | | |
|---|---|---|
| CN | 103149723 A | 6/2013 |
| CN | 103150050 A | 6/2013 |
| CN | 103558941 A | 2/2014 |
| CN | 1044063105 A | 9/2014 |
| CN | 106484185 A | 3/2017 |
| CN | 107102776 A | 8/2017 |
| CN | 107357455 A | 11/2017 |
| CN | 107943350 A | 4/2018 |
| JP | 2017198892 A | 11/2017 |
| KR | 201300661794 A | 6/2013 |

* cited by examiner

METHOD FOR CONTROLLING TOUCH SCREEN, APPARATUS AND DEVICE, STORAGE MEDIUM AND PROCESSOR

CROSS-REFERENCE TO RELATED APPLICATIONS

The present application claims priority to Chinese Patent Application No. 201810967720.3, submitted to the National Intellectual Property Administration, PRC on Aug. 23, 2018, and entitled "Method For Controlling Touch Screen, Apparatus and Device, Storage Medium and Processor", the disclosure of which is hereby incorporated by reference in its entirety.

TECHNICAL FIELD

The disclosure relates to the field of computers, and particularly to a method for controlling touch screen, apparatus and device, a storage medium and a processor.

BACKGROUND

Along with the maturing of In-Cell Touch (ICT) technologies, a market share occupied by ICT screens in liquid crystal screen products of notebook computers and displays has gradually increased.

For an ICT screen, i.e., an ICT liquid crystal screen, a touch electrode of the touch screen is embedded in the liquid crystal display screen, so that the thickness of a whole module may be reduced, and the manufacturing cost of the touch screen is reduced.

The touch electrode is embedded in the liquid crystal display screen, so that the liquid crystal display screen has a touch function and a display function. However, during a practical application, a circuit of the liquid crystal screen may not support simultaneous use of the touch function and the display function, so that the touch function and the display function are required to be used alternately. If the touch function and the display function are switched at a higher speed, an effect is closer to simultaneous use of the touch function and the display function.

However, no matter whether a touch behavior exists, the ICT screen is required to be switched between the touch function and the display function and may not be flexibly controlled.

For the problem that an existing touch screen control solution is not so flexible, there is yet no effective solution at present.

SUMMARY

According to an aspect of the embodiments of the disclosure, a method for controlling touch screen is provided, which includes that: a detection result is acquired, the detection result is used for representing whether a touch behavior over a touch panel of a touch screen exists; a feedback signal is determined according to the detection result; and a working mode of the touch screen is controlled according to the feedback signal.

Optionally, the working mode includes: an ICT single display mode, configured to control the touch screen not to have a touch function; an ICT touch mode, configured to control the touch screen to have the touch function; an ICT entry mode, configured to control the touch screen to be switched from the ICT single display mode to the ICT touch mode; and an ICT exit mode, configured to control the touch screen to be switched from the ICT touch mode to the ICT single display mode.

Optionally, the operation that the feedback signal is determined according to the detection result includes that: the working mode of the touch screen in a first time duration is acquired, the first time duration is a previous time duration of a predetermined time duration where the feedback signal is located; and the feedback signal is determined according to the working mode in the first time duration and the detection result.

Optionally, the operation that the feedback signal is determined according to the working mode in the first time duration and the detection result includes that: in the case that the working mode in the first time duration is the ICT single display mode or the ICT exit mode and the touch behavior does not exist in the predetermined time duration, it is determined that the feedback signal is in a first feedback state; and the operation that the working mode of the touch screen is controlled according to the feedback signal includes that: a first control instruction is generated according to the first feedback state, the first control instruction is used for controlling the working mode of the touch screen in the predetermined time duration to be the ICT single display mode.

Optionally, the operation that the feedback signal is determined according to the working mode in the first time duration and the detection result includes that: in the case that the working mode in the first time duration is the ICT single display mode or the ICT exit mode and the touch behavior exists in the predetermined time duration, it is determined that the feedback signal is in a first switching state, the first switching state is used for representing that the feedback signal is switched from the first feedback state to a second feedback state; and the operation that the working mode of the touch screen is controlled according to the feedback signal includes that: a second control instruction is generated according to the first switching state, the second control instruction is used for controlling the working mode of the touch screen in the predetermined time duration to be the ICT entry mode and the ICT entry mode is used for representing that, in the case that the feedback signal is switched from the first feedback state to the second feedback state, control the touch screen to have the touch function.

Optionally, the operation that the feedback signal is determined according to the working mode in the first time duration and the detection result includes that: in the case that the working mode in the first time duration is the ICT entry mode or the ICT touch mode and the touch behavior exists in the predetermined time duration, the feedback signal is controlled to be in the second feedback state; and the operation that the working mode of the touch screen is controlled according to the feedback signal includes that: a third control instruction is generated according to the second feedback state, the third control instruction is used for controlling the working mode of the touch screen in the predetermined time duration to be the ICT touch mode.

Optionally, the operation that the feedback signal is determined according to the working mode in the first time duration and the detection result includes that: in the case that the working mode in the first time duration is the ICT touch mode or the ICT entry mode and the touch behavior does not exist in the predetermined time duration, the feedback signal is controlled to be in a second switching state, the second switching state is used for representing that the feedback signal is switched from the second feedback state to the first feedback state; and the operation that the working mode of the touch screen is controlled according to the feedback signal includes that: a fourth control instruction is generated according to the second switching state, the fourth control instruction is used for controlling the working mode of the touch screen in the predetermined time duration to be the ICT exit mode and the ICT exit mode is used for representing that, after the predetermined time duration ends, the working mode is switched to the ICT single display mode.

Optionally, the first feedback state is configured to represent a state that the feedback signal is at a low potential.

Optionally, the second feedback state is configured to represent a state that the feedback signal is at a high potential.

According to another aspect of the embodiments of the disclosure, a method for controlling touch screen is also provided, which includes that: a touch instruction is detected, the touch instruction is used for representing that a touch behavior over a panel of a touch screen exists; a feedback signal is determined according to the touch instruction; and the feedback signal is sent to a Timing Controller (TCON) chip, the TCON chip being configured to control a working mode of the touch screen according to the feedback signal.

According to another aspect of the embodiments of the disclosure, an apparatus for controlling touch screen is also provided, which includes: a first acquisition component, configured to acquire a detection result, the detection result is used for representing whether a touch behavior over a touch panel of a touch screen exists; a first determination component, configured to determine a feedback signal according to the detection result; and a control component, configured to control a working mode of the touch screen according to the feedback signal.

According to another aspect of the embodiments of the disclosure, an apparatus for controlling touch screen is also provided, which includes: a second acquisition component, configured to acquire a detection result, the detection result is used for representing whether a touch behavior over a touch panel of a touch screen exists; a second determination component, configured to determine a feedback signal according to the detection result; and a sending component, configured to send the feedback signal to a TCON chip, the TCON chip being configured to control a working mode of the touch screen according to the feedback signal.

According to another aspect of the embodiments of the disclosure, a device for controlling touch screen is also provided, which includes: a touch panel, configured to detect whether a touch behavior exists to generate a detection result; a driver chip, configured to determine a feedback signal according to the detection result; and a TCON chip, configured to return a touch synchronization signal corresponding to the feedback signal to the driver chip according to the feedback signal, the driver chip controlling a working mode of a touch screen according to the touch synchronization signal.

According to another aspect of the disclosure, the embodiments of the disclosure also provide a storage medium, which includes a stored program, the program running to control a device where the storage medium is located to execute the method for controlling touch screen.

According to another aspect of the disclosure, the embodiments of the disclosure also provide a processor, which is configured to run a program, the program running to execute the method for controlling touch screen.

BRIEF DESCRIPTION OF THE DRAWINGS

The drawings described here are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION OF THE EMBODIMENTS

In order to make those skilled in the art understand the solutions of the disclosure better, the technical solutions in the embodiments of the disclosure will be clearly and completely described below in combination with the drawings in the embodiments of the disclosure. It is apparent that the described embodiments are not all embodiments but only a part of the embodiments of the disclosure. All other embodiments obtained by those of ordinary skill in the art based on the embodiments in the disclosure without creative work shall fall within the scope of protection of the disclosure.

It is to be noted that the terms like "first" and "second" in the specification, claims and accompanying drawings of the disclosure are used for differentiating the similar objects, but do not have to describe a specific order or a sequence. It is to be understood that data used like this may be exchanged under a proper condition for implementation of the embodiments of the disclosure described here in sequences besides those shown or described herein. In addition, terms "include" and "have" and any transformation thereof are intended to cover nonexclusive inclusions. For example, a process, method, system, product or device including a series of steps or components is not limited to those clearly listed steps or components, but may include other steps or components which are not clearly listed or inherent in the process, the method, the system, the product or the device.

According to an embodiment of the disclosure, an embodiment of a method for controlling touch screen is provided. It is to be noted that the steps presented in the flowchart of the drawings can be executed in a computer system like a set of computer executable instructions and, moreover, although a logical sequence is shown in the flowchart, in some cases, the presented or described steps can be executed in a sequence different from that described here.

According to the technical solution provided in the disclosure, an ICT screen may be controlled.

It is to be noted that control of the ICT screen mainly depends on cooperation of a TCON chip and a driver chip.

Figure 1:
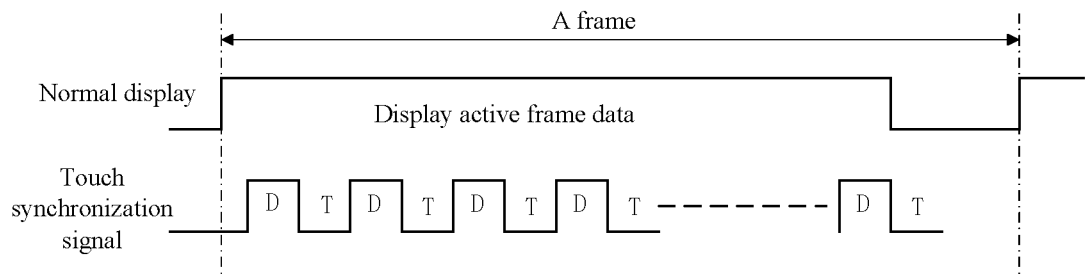
FIG. 1 is a schematic diagram of an ICT screen control process.

FIG. 1 is a schematic diagram of an ICT screen control process. As shown in FIG. 1, an ICT screen is required to be split into a display processing window and touch processing window that are spaced in time originally required by displaying of a normal frame of data to realize display (D) and touch (T) functions in a time-sharing manner through a touch synchronization signal (Touch_SYNC).

It is to be noted that the display (D) function is realized through the display processing window, the touch synchronization signal corresponding to the display (D) function being at a high potential, and the touch (T) function is realized through the touch processing window, the touch synchronization signal corresponding to the touch (T) function being at a low potential.

Optionally, the TCON chip may unidirectionally control a switching frequency of the display (D) function and touch (T) function in the touch synchronization signal.

Optionally, in the case that display and touch behaviors simultaneously exist, the TCON chip and the driver chip are required to complete processing the display data in time shorter than the normal frame. This means internal clock frequencies of the TCON chip and the driver chip are required to be higher than a normal display frequency.

However, no matter whether the touch behavior exists, the internal clock frequencies of the TCON chip and the driver chip are required to be higher than the normal display frequency.

Figure 2:
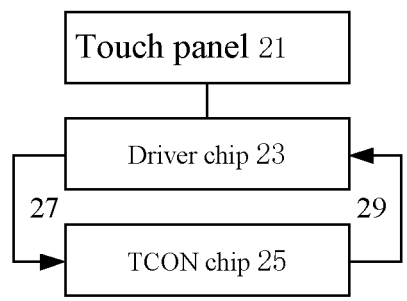
FIG. 2 is a schematic diagram of a device for controlling touch screen according to an embodiment of the disclosure.

FIG. 2 is a schematic diagram of a device for controlling touch screen according to an embodiment of the disclosure. As shown in FIG. 2, a touch panel 21, a driver chip 23 and a TCON chip 25 are included.

The touch panel 21 is configured to detect whether a touch behavior exists to generate a detection result. The driver chip 23 is configured to determine a feedback signal 27 according to the detection result. The TCON chip 25 is configured to return a touch synchronization signal 29 corresponding to the feedback signal 27 to the driver chip according to the feedback signal. The driver chip 23 controls a working mode of a touch screen according to the touch synchronization signal 29.

According to the embodiment of the disclosure, whether the touch behavior over the touch panel of the touch screen exists is detected to obtain the detection result, the detection result is transmitted to the driver chip, the driver chip determines the feedback signal according to the detection result and transmits the feedback signal to the TCON chip, the TCON chip may respond to the feedback signal and return the touch synchronization signal corresponding to the feedback signal to the driver chip, and then the driver chip may control the working mode of the touch screen under the control of the touch synchronization signal. In such a manner, a purpose of flexibly controlling the working mode of the touch screen is achieved, so that a technical effect of flexibly controlling the touch screen is achieved, and furthermore, the technical problem that an existing touch screen control solution is not so flexible is solved.

According to an embodiment of the disclosure, an embodiment of a method for controlling touch screen is also provided. It is to be noted that the method for controlling touch screen may be executed based on a hardware environment of the abovementioned device for controlling touch screen.

Figure 3:
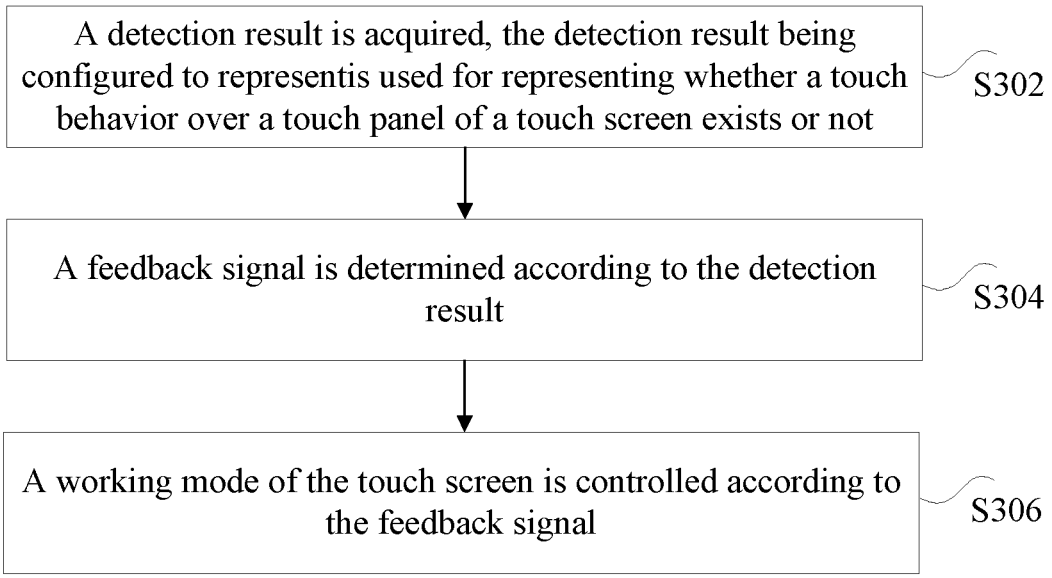
FIG. 3 is a flowchart of a method for controlling touch screen according to an embodiment of the disclosure.

FIG. 3 is a flowchart of a method for controlling touch screen according to an embodiment of the disclosure. As shown in FIG. 3, the method includes the following steps.

In S302, a detection result is acquired, the detection result is used for representing whether a touch behavior over a touch panel of a touch screen exists.

In S304, a feedback signal is determined according to the detection result.

In S306, a working mode of the touch screen is controlled according to the feedback signal.

In the embodiment of the disclosure, whether the touch behavior over the touch panel of the touch screen exists is detected to obtain the detection result, the feedback signal is determined according to the detection result, and then the working mode of the touch screen is controlled through the feedback signal. In such a manner, a purpose of flexibly controlling the working mode of the touch screen is achieved, so that a technical effect of flexibly controlling the touch screen is achieved, and furthermore, the technical problem that an existing touch screen control solution is not so flexible is solved.

In S306, a touch synchronization signal corresponding to the feedback signal may be generated according to the feedback signal through a TCON chip, so that the working mode of the touch screen may be controlled according to the touch synchronization signal, and the working mode may be switched.

In some embodiments of the disclosure, the working mode includes: an ICT single display mode, configured to control the touch screen not to have a touch function; an ICT touch mode, configured to control the touch screen to have the touch function; an ICT entry mode, configured to control the touch screen to be switched from the ICT single display mode to the ICT touch mode; and an ICT exit mode, configured to control the touch screen to be switched from the ICT touch mode to the ICT single display mode.

Optionally, the ICT single display mode is configured to control the touch screen not to have the touch function. Therefore, in the ICT single display mode, only a display (D) function may be provided through the touch synchronization signal (Touch-SYNC) of the touch screen.

Optionally, the ICT touch mode is configured to control the touch screen to have the touch function. Therefore, in the ICT touch mode, the display (D) function and the touch (T) function may be realized in a time-sharing manner through the touch synchronization signal (Touch-SYNC) of the touch screen.

In some embodiments of the disclosure, the operation that the feedback signal is determined according to the detection result includes that: the working mode of the touch screen in a first time duration is acquired, the first time duration is a previous time duration of a predetermined time duration where the feedback signal is located; and the feedback signal is determined according to the working mode in the first time duration and the detection result.

According to the embodiment of the disclosure, a time duration where the feedback signal is located is determined as the predetermined time duration, and the previous time duration of the feedback signal is determined as the first time duration. In the case that the feedback signal is determined, the feedback signal in the predetermined time duration is determined according to the working mode in the first time duration and the detection result of whether the touch behavior exists in the predetermined time duration, and furthermore, the working mode in the predetermined time duration may be determined according to the feedback signal.

It is to be noted here that the feedback signal may be a binary signal and has a first feedback state and a second feedback state, the first feedback state is used for representing a state that the feedback signal is at a low potential and the second feedback state is used for representing a state that the feedback signal is at a high potential. In the predetermined time duration, the feedback signal may include the first feedback state, the second feedback state, a first switching state of switching from the first feedback state to the second feedback state and a second switching state of switching from the second feedback state to the first feedback state.

Optionally, in the case that the working mode in the first time duration is the ICT single display mode or the ICT exit mode, after the first time duration ends, the feedback signal is in the first feedback state, namely an initial state of the feedback signal in the predetermined time duration is the first feedback state, and if the touch behavior is not detected in the predetermined time duration, the feedback signal is kept in the first feedback state in the predetermined time duration and the working mode of the touch screen in the predetermined time duration is the ICT single display mode.

In some embodiments of the disclosure, the operation that the feedback signal is determined according to the working mode in the first time duration and the detection result includes that: in the case that the working mode in the first time duration is the ICT single display mode or the ICT exit mode and the touch behavior does not exist in the predetermined time duration, it is determined that the feedback signal is in a first feedback state; and the operation that the working mode of the touch screen is controlled according to the feedback signal includes that: a first control instruction is generated according to the first feedback state, the first control instruction is used for controlling the working mode of the touch screen in the predetermined time duration to be the ICT single display mode.

Optionally, the first control instruction may be a touch synchronization signal only with the display (D) function.

Figure 4:
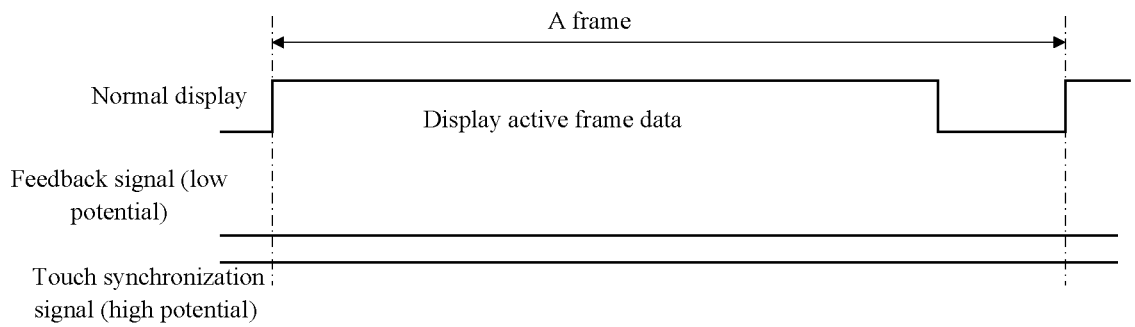
FIG. 4 is a schematic diagram of an ICT single display mode according to an embodiment of the disclosure.

FIG. 4 is a schematic diagram of an ICT single display mode according to an embodiment of the disclosure. As shown in FIG. 4, when the touch panel does not detect the touch behavior all the time, a potential of the feedback signal (Touch_Process) is pulled down by the driver chip. The TCON chip detects that the potential of the feedback signal (Touch_Process) is low, pulls up a potential of the touch synchronization signal (Touch_SYNC) and simultaneously reduces an internal clock to a normal display frequency. The driver chip also reduces an internal clock to the normal display frequency based on a state that the potential of the touch synchronization signal (Touch_SYNC) is high such that the touch screen works in the ICT single display mode.

Optionally, in the case that the working mode in the first time duration is the ICT single display mode or the ICT exit mode, after the first time duration ends, the feedback signal is in the first feedback state, namely the initial state of the feedback signal in the predetermined time duration is the first feedback state, and if the touch behavior is detected in the predetermined time duration, the feedback signal is switched from the first feedback state to the second feedback state in the predetermined time duration to obtain the first switching state of the feedback signal and the working mode of the touch screen in the predetermined time duration is the ICT entry mode.

In some embodiments of the disclosure, the operation that the feedback signal is determined according to the working mode in the first time duration and the detection result includes that: in the case that the working mode in the first time duration is the ICT single display mode or the ICT exit mode and the touch behavior exists in the predetermined time duration, it is determined that the feedback signal is in a first switching state, the first switching state is used for representing that the feedback signal is switched from the first feedback state to a second feedback state; and the operation that the working mode of the touch screen is controlled according to the feedback signal includes that: a second control instruction is generated according to the first switching state, the second control instruction is used for controlling the working mode of the touch screen in the predetermined time duration to be the ICT entry mode and the ICT entry mode is used for representing that, in the case that the feedback signal is switched from the first feedback state to the second feedback state, control the touch screen to have the touch function.

Optionally, the second control instruction may be a touch synchronization signal only with the touch (T) function.

Figure 5:
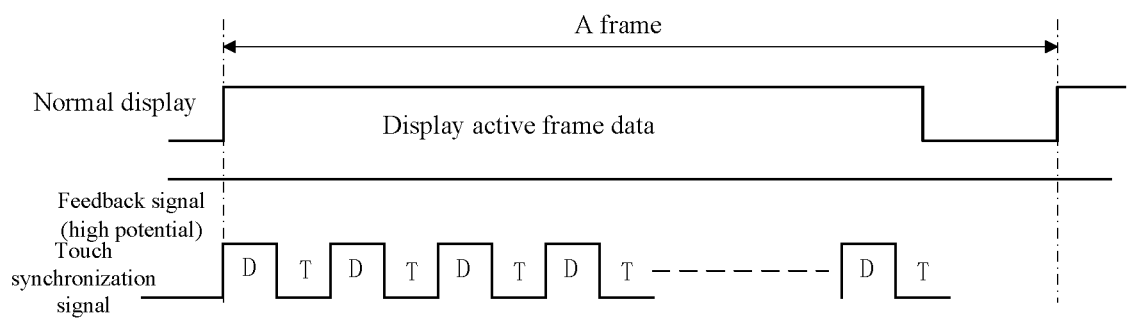
FIG. 5 is a schematic diagram of an ICT entry mode according to an embodiment of the disclosure.

FIG. 5 is a schematic diagram of an ICT entry mode according to an embodiment of the disclosure. As shown in FIG. 5, when the touch panel detects the touch behavior exists all the time, the potential of the feedback signal (Touch_Process) is pulled up by the driver chip. The TCON chip detects that the potential of the feedback signal (Touch_Process) is high, switches the touch synchronization signal (Touch_SYNC) according to display and touch data processing windows and simultaneously regulates the internal clock to a double frequency mode. The driver chip also receives display data and sends touch data in the time-sharing manner based on the state of the touch synchronization signal (Touch_SYNC) such that the touch screen works in the ICT touch mode.

Optionally, in the case that the working mode in the first time duration is the ICT entry mode or the ICT touch mode, after the first time duration ends, the feedback signal is in the second feedback state, namely the initial state of the feedback signal in the predetermined time duration is the second feedback state, and if the touch behavior is detected in the predetermined time duration, the feedback signal is kept in the second feedback state in the predetermined time duration and the working mode of the touch screen in the predetermined time duration is the ICT touch mode.

In some embodiments of the disclosure, the operation that the feedback signal is determined according to the working mode in the first time duration and the detection result includes that: in the case that the working mode in the first time duration is the ICT entry mode or the ICT touch mode and the touch behavior exists in the predetermined time duration, the feedback signal is controlled to be in the second feedback state; and the operation that the working mode of the touch screen is controlled according to the feedback signal includes that: a third control instruction is generated according to the second feedback state, the third control instruction is used for controlling the working mode of the touch screen in the predetermined time duration to be the ICT touch mode.

Optionally, the third control instruction may be switched from the touch synchronization signal only with the display (D) function to a touch synchronization signal realizing the display (D) and touch (T) function in the time-sharing manner.

Figure 6:
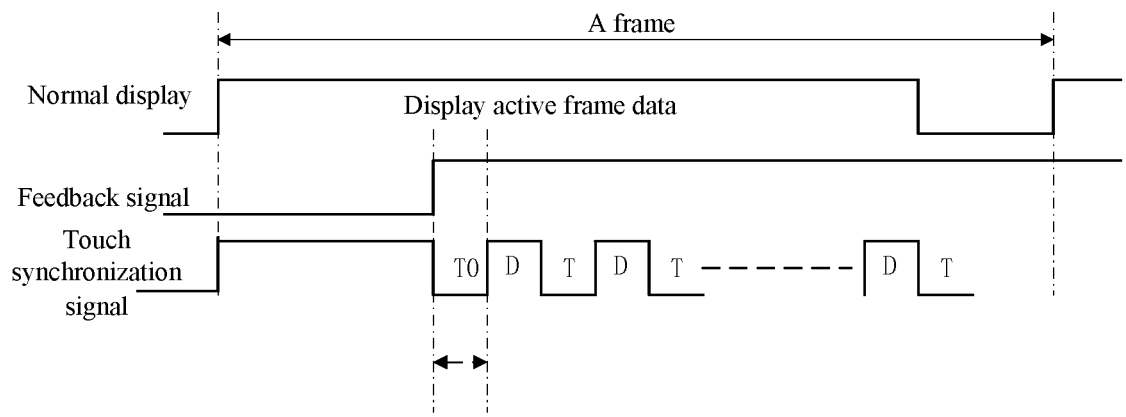
FIG. 6 is a schematic diagram of an ICT touch mode according to an embodiment of the disclosure.

FIG. 6 is a schematic diagram of an ICT touch mode according to an embodiment of the disclosure. As shown in FIG. 6, during a practical application, a touch behavior may occur anytime. When it is detected that the touch behavior occurs, an immediate switching touch processing process is required such that the touch screen works in the ICT entry mode.

For ensuring a smooth switching process, it is necessary to display the switching process in certain time T0, and a minimum of T0 is required to meet the following formula:

$$T0 > \frac{\text{Vertical\_Active}}{\text{Block}} \times \frac{1}{2} \times \frac{\text{Horizontal\_Line\_Time}}{2},$$

where Vertical-Active is the row number of a frame, Block is the number of display processing windows split in the ICT touch mode, and Horizontal_Line_Time is time of a row.

Optionally, in the case that the working mode in the first time duration is the ICT touch mode or the ICT entry mode, after the first time duration ends, the feedback signal is in the second feedback state, namely the initial state of the feedback signal in the predetermined time duration is the second feedback state, and if the touch behavior is not detected in the predetermined time duration, the feedback signal is switched from the second feedback state to the first feedback state in the predetermined time duration to obtain the second switching state of the feedback signal and the working mode of the touch screen in the predetermined time duration is the ICT exit mode.

In some embodiments of the disclosure, the operation that the feedback signal is determined according to the working mode in the first time duration and the detection result includes that: in the case that the working mode in the first time duration is the ICT touch mode or the ICT entry mode and the touch behavior does not exist in the predetermined time duration, the feedback signal is controlled to be in a second switching state, the second switching state is used for representing that the feedback signal is switched from the second feedback state to the first feedback state; and the operation that the working mode of the touch screen is controlled according to the feedback signal includes that: a fourth control instruction is generated according to the second switching state, the fourth control instruction is used for controlling the working mode of the touch screen in the predetermined time duration to be the ICT exit mode and the ICT exit mode is used for representing that, after the predetermined time duration ends, the working mode is switched to the ICT single display mode.

Optionally, the fourth control instruction may be switched from the touch synchronization signal only with the touch (T) function to the touch synchronization signal realizing the display (D) and touch (T) function in the time-sharing manner.

Figure 7:
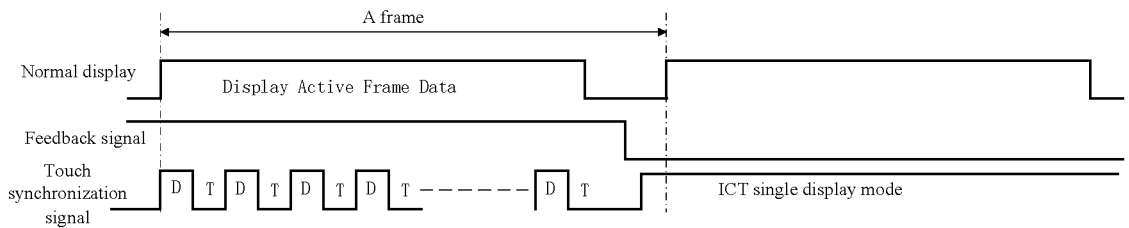
FIG. 7 is a schematic diagram of an ICT exit mode according to an embodiment of the disclosure.

FIG. 7 is a schematic diagram of an ICT exit mode according to an embodiment of the disclosure. As shown in FIG. 7, the touch panel, when not detecting the touch behavior in a period of time (for example, predetermined time), does not immediately exit from the ICT touch mode, and instead, exits from the ICT touch mode in a vertical blanking interval. In such a manner, the touch screen may smoothly exit to work in the ICT exit mode with least influence on the TCON chip and the driver chip.

According to the embodiment of the disclosure, for improving the integrity, compatibility and flexibility of an automatic chip testing solution, these problems may be solved by a solution of improving a chip testing circuit board. In the disclosure, a feedback mechanism of the driver chip is designed based on a limit of the existing solution to distinguish whether the touch behavior exists, and furthermore, the clock may be optimized under different conditions according to feedback information to reduce the power consumption.

According to the technical solution provided in the disclosure, the feedback signal (Touch_Process) of the driver chip for the TCON chip is added, so that the internal clocks of the TCON chip and the driver chip may work in optimal states, and the power consumption may further be reduced on the premise of ensuring the performance.

According to an embodiment of the disclosure, an embodiment of a method for controlling touch screen is also provided. It is to be noted that the method for controlling touch screen may be executed based on a hardware environment of the abovementioned device for controlling touch screen.

Figure 8:
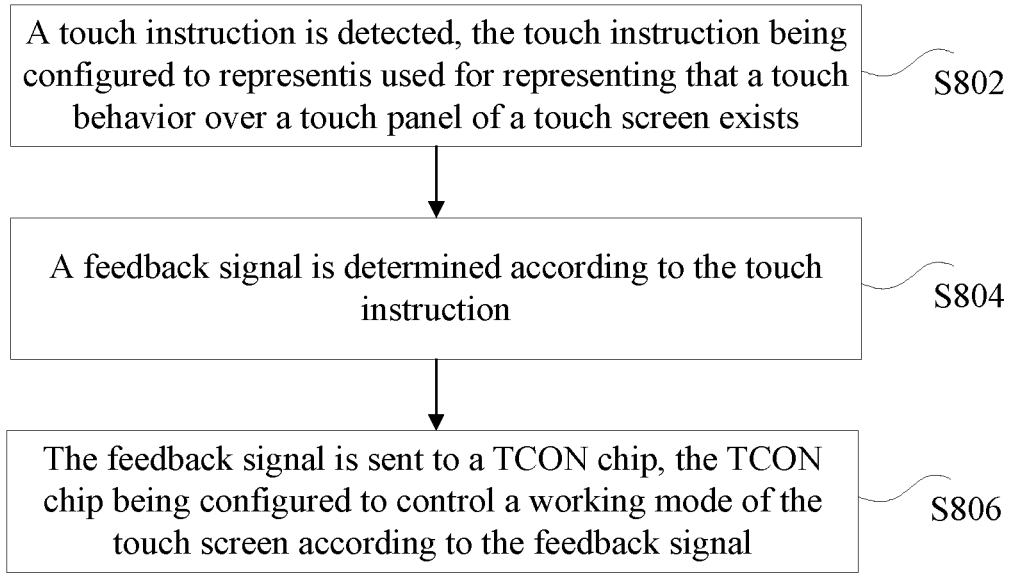
FIG. 8 is a flowchart of a method for controlling touch screen according to an embodiment of the disclosure.

FIG. 8 is a flowchart of a method for controlling touch screen according to an embodiment of the disclosure. As shown in FIG. 8, the method includes the following steps.

In S802, a touch instruction is detected, the touch instruction is used for representing that a touch behavior over a touch panel of a touch screen exists.

In S804, a feedback signal is determined according to the touch instruction.

In S806, the feedback signal is sent to a TCON chip, the TCON chip being configured to control a working mode of the touch screen according to the feedback signal.

In the embodiment of the disclosure, whether the touch behavior over the touch panel of the touch screen exists is detected to obtain the detection result, the feedback signal is determined according to the detection result, and the feedback signal is sent to the TCON chip for the TCON chip to control the working mode of the touch screen according to the feedback signal. In such a manner, a purpose of flexibly controlling the working mode of the touch screen is achieved, so that a technical effect of flexibly controlling the touch screen is achieved, and furthermore, the technical problem that an existing touch screen control solution is not so flexible is solved.

In S806, the TCON chip may generate a touch synchronization signal corresponding to the feedback signal according to the feedback signal, so that the working mode of the touch screen may be controlled according to the touch synchronization signal.

According to another embodiment of the disclosure, a storage medium is also provided, which includes a stored program, the program running to execute any abovementioned method.

According to another embodiment of the disclosure, a processor is also provided, which is configured to run a program, the program running to execute any abovementioned method.

According to an embodiment of the disclosure, an embodiment of an apparatus for controlling touch screen is also provided. It is to be noted that the apparatus for controlling touch screen may be configured to execute the method for controlling touch screen in the embodiments of the disclosure. The method for controlling touch screen in the embodiments of the disclosure may be executed in the apparatus for controlling touch screen.

Figure 9:
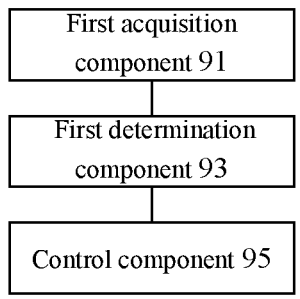
FIG. 9 is a schematic diagram of an apparatus for controlling touch screen according to an embodiment of the disclosure.

FIG. 9 is a schematic diagram of an apparatus for controlling touch screen according to an embodiment of the disclosure. As shown in FIG. 9, the apparatus may include a first acquisition component 91, a first determination component 93 and a control component 95.

The first acquisition component 91 is configured to acquire a detection result, the detection result is used for representing whether a touch behavior over a touch panel of a touch screen exists. The first determination component 93 is configured to determine a feedback signal according to the detection result. The control component 95 is configured to control a working mode of the touch screen according to the feedback signal.

It is to be noted that the first acquisition component 91 in the embodiment may be configured to execute S302 in the embodiments of the disclosure, the first determination component 93 in the embodiment may be configured to execute S304 in the embodiments of the disclosure and the control component 95 in the embodiment may be configured to execute S306 in the embodiments of the disclosure. The modules implement an example and application scenario the same as those implemented by the corresponding steps but are not limited to the contents disclosed in the abovementioned embodiment.

In the embodiment of the disclosure, whether the touch behavior over the touch panel of the touch screen exists is detected to obtain the detection result, the feedback signal is determined according to the detection result, and then the working mode of the touch screen is controlled through the feedback signal. In such a manner, a purpose of flexibly controlling the working mode of the touch screen is achieved, so that a technical effect of flexibly controlling the touch screen is achieved, and furthermore, the technical problem that an existing touch screen control solution is not so flexible is solved.

In some embodiments of the disclosure, the working mode includes: an ICT single display mode, configured to control the touch screen not to have a touch function; an ICT touch mode, configured to control the touch screen to have the touch function; an ICT entry mode, configured to control the touch screen to be switched from the ICT single display mode to the ICT touch mode; and an ICT exit mode, configured to control the touch screen to be switched from the ICT touch mode to the ICT single display mode.

In some embodiments of the disclosure, the first determination component includes: an acquisition module, configured to acquire the working mode of the touch screen in a first time duration, the first time duration is a previous time duration of a predetermined time duration where the feedback signal is located; and a first determination module, configured to determine the feedback signal according to the working mode in the first time duration and the detection result.

In some embodiments of the disclosure, the first determination module includes a second determination module, configured to, in the case that the working mode in the first time duration is the ICT single display mode or the ICT exit mode and the touch behavior does not exist in the predetermined time duration, determine that the feedback signal is in a first feedback state; and the control component includes a first generation module, configured to generate a first control instruction according to the first feedback state, the first control instruction is used for controlling the working mode of the touch screen in the predetermined time duration to be the ICT single display mode.

In some embodiments of the disclosure, the first determination module includes a third determination module, configured to, in the case that the working mode in the first time duration is the ICT single display mode or the ICT exit mode and the touch behavior exists in the predetermined time duration, determine that the feedback signal is in a first switching state, the first switching state is used for representing that the feedback signal is switched from the first feedback state to a second feedback state; and the control component includes a second generation module, configured to generate a second control instruction according to the first switching state, the second control instruction is used for controlling the working mode of the touch screen in the predetermined time duration to be the ICT entry mode and the ICT entry mode is used for representing that, in the case that the feedback signal is switched from the first feedback state to the second feedback state, control the touch screen to have the touch function.

In some embodiments of the disclosure, the first determination module includes a fourth determination module, configured to, in the case that the working mode in the first time duration is the ICT entry mode or the ICT touch mode and the touch behavior exists in the predetermined time duration, control the feedback signal to be in the second feedback state; and the control component includes a third generation module, configured to generate a third control instruction according to the second feedback state, the third control instruction is used for controlling the working mode of the touch screen in the predetermined time duration to be the ICT touch mode.

In some embodiments of the disclosure, the first determination module includes a fifth determination module, configured to, in the case that the working mode in the first time duration is the ICT touch mode or the ICT entry mode and the touch behavior does not exist in the predetermined time duration, control the feedback signal to be in a second switching state, the second switching state is used for representing that the feedback signal is switched from the second feedback state to the first feedback state; and the control component includes a fourth generation component, configured to generate a fourth control instruction according to the second switching state, the fourth control instruction is used for controlling the working mode of the touch screen in the predetermined time duration to be the ICT exit mode and the ICT exit mode is used for representing that, after the predetermined time duration ends, the working mode is switched to the ICT single display mode.

In some embodiments of the disclosure, the first feedback state is configured to represent a state that the feedback signal is at a low potential.

In some embodiments of the disclosure, the second feedback state is configured to represent a state that the feedback signal is at a high potential.

According to an embodiment of the disclosure, an embodiment of an apparatus for controlling touch screen is also provided. It is to be noted that the apparatus for controlling touch screen may be configured to execute the method for controlling touch screen in the embodiments of the disclosure. The method for controlling touch screen in the embodiments of the disclosure may be executed in the apparatus for controlling touch screen.

Figure 10:
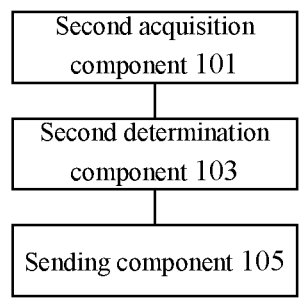
FIG. 10 is a schematic diagram of an apparatus for controlling touch screen according to an embodiment of the disclosure.

FIG. 10 is a schematic diagram of an apparatus for controlling touch screen according to an embodiment of the disclosure. As shown in FIG. 10, the apparatus may include a second acquisition component 101, a second determination component 103 and a sending component 105.

The second acquisition component 101 is configured to acquire a detection result, the detection result is used for representing whether a touch behavior over a touch panel of a touch screen exists. The second determination component 103 is configured to determine a feedback signal according to the detection result. The sending component 105 is configured to send the feedback signal to a TCON chip, the TCON chip being configured to control a working mode of the touch screen according to the feedback signal.

It is to be noted that the second acquisition component 101 in the embodiment may be configured to execute S802 in the embodiments of the disclosure, the second determination component 103 in the embodiment may be configured to execute S804 in the embodiments of the disclosure and the sending component 105 in the embodiment may be configured to execute S806 in the embodiments of the disclosure. The modules implement an example and application scenario the same as those implemented by the corresponding steps but are not limited to the contents disclosed in the abovementioned embodiment.

In the embodiment of the disclosure, whether the touch behavior over the touch panel of the touch screen exists is detected to obtain the detection result, the feedback signal is determined according to the detection result, and the feedback signal is sent to the TCON chip for the TCON chip to control the working mode of the touch screen according to the feedback signal. In such a manner, a purpose of flexibly controlling the working mode of the touch screen is achieved, so that a technical effect of flexibly controlling the touch screen is achieved, and furthermore, the technical problem that an existing touch screen control solution is not so flexible is solved.

The sequence numbers of the embodiments of the disclosure are only adopted for description and do not represent superiority-inferiority of the embodiments.

In the embodiments of the disclosure, the descriptions of the embodiments focus on different aspects. The part which is not described in a certain embodiment in detail may refer to the related description of the other embodiments.

In some embodiments provided in the application, it is to be understood that the disclosed technical contents may be implemented in other manners. Herein, the device embodiment described above is only schematic. For example, division of the components is only division of logical functions, and other division manners may be adopted during practical implementation. For example, multiple components or components may be combined or integrated to another system, or some features may be ignored or are not executed. In addition, shown or discussed coupling, direct coupling or communication connection may be implemented through indirect coupling or communication connection of some interfaces, components or modules, and may be in an electrical form or other forms.

The components described as separate parts may or may not be separate physically, and parts displayed as components may or may not be physical components, that is, they may be located in the same place, or may also be distributed to multiple components. Part or all of the components may be selected to achieve the purpose of the solutions of the embodiments according to a practical requirement.

In addition, each functional component in each embodiment of the disclosure may be integrated into a processing component, each component may also physically exist independently, and two or more than two components may also be integrated into a component. The integrated component may be implemented in a hardware form and may also be implemented in form of software functional component.

If being implemented in form of software functional component and sold or used as an independent product, the integrated component may be stored in a computer-readable storage medium. Based on such an understanding, the technical solutions of the disclosure substantially or parts making contributions to the conventional art or all or part of the technical solutions may be embodied in form of software product. The computer software product is stored in a storage medium, including a plurality of instructions configured to enable a computer device (which may be a PC, a server, a network device or the like) to execute all or part of the steps of the method in each embodiment of the disclosure. The storage medium includes various media capable of storing program codes such as a U disk, a Read-Only Memory (ROM), a Random Access Memory (RAM), a mobile hard disk, a magnetic disk or a compact disc.

The above is only the preferred embodiment of the disclosure. It is to be pointed out that those of ordinary skill in the art may also make a number of improvements and embellishments without departing from the principle of the disclosure and these improvements and embellishments shall also fall within the scope of protection of the disclosure.

INDUSTRIAL APPLICABILITY

The solutions provided in the embodiments of the disclosure may be applied to a touch screen control process. Through the embodiments of the disclosure, the technical problem that the existing touch screen control solution is not so flexible is solved, and the working mode of the touch screen may be flexibly controlled.

What is claimed is:

1. A method for controlling touch screen, comprising:
acquiring a detection result, the detection result is used for representing whether a touch behavior over a touch panel of a touch screen exists;
determining a feedback signal according to the detection result; and
controlling a working mode of the touch screen according to the feedback signal wherein the working mode comprises: an In-Cell Touch (ICT) single display mode, configured to control the touch screen not to have a touch function; an ICT touch mode, configured to control the touch screen to have the touch function; an ICT entry mode, configured to control the touch screen to be switched from the ICT single display mode to the ICT touch mode; and an ICT exit mode, configured to control the touch screen to be switched from the ICT touch mode to the ICT single display mode;
wherein determining the feedback signal according to the detection result comprises: acquiring the working mode of the touch screen in a first time duration, the first time duration is a previous time duration of a predetermined time duration where the feedback signal is located; and determining the feedback signal according to the working mode in the first time duration and the detection result; determining the feedback signal according to the working mode in the first time duration and the detection result comprises: in a case that the working mode in the first time duration is the ICT single display mode or the ICT exit mode and the touch behavior does not exist in the predetermined time duration, determining that the feedback signal is in a first feedback state; and controlling the working mode of the touch screen according to the feedback signal comprises: generating a first control instruction according to the first feedback state, the first control instruction is used for controlling the working mode of the touch screen in the predetermined time duration to be the ICT single display mode.

2. The method as claimed in claim 1, wherein
determining the feedback signal according to the working mode in the first time duration and the detection result comprises: in the case that the working mode in the first time duration is the ICT single display mode or the ICT exit mode and the touch behavior exists in the predetermined time duration, determining that the feedback signal is in a first switching state, the first switching state is used for representing that the feedback signal is switched from the first feedback state to a second feedback state; and controlling the working mode of the touch screen according to the feedback signal comprises: generating a second control instruction according to the first switching state, the second control instruction is used for controlling the working mode of the touch screen in the predetermined time duration to be the ICT entry mode and the ICT entry mode is used for representing that, in the case that the feedback signal is switched from the first feedback state to the second feedback state, control the touch screen to have the touch function.

3. The method as claimed in claim 2, wherein the second feedback state is configured to represent a state that the feedback signal is at a high potential.

4. The method as claimed in claim 2, wherein the first feedback state is configured to represent a state that the feedback signal is at a low potential.

5. The method as claimed in claim 1, wherein
determining the feedback signal according to the working mode in the first time duration and the detection result comprises: in the case that the working mode in the first time duration is the ICT entry mode or the ICT touch mode and the touch behavior exists in the predetermined time duration, controlling the feedback signal to be in the second feedback state; and controlling the working mode of the touch screen according to the feedback signal comprises: generating a third control instruction according to the second feedback state, the third control instruction is used for controlling the working mode of the touch screen in the predetermined time duration to be the ICT touch mode.

6. The method as claimed in claim 5, wherein the second feedback state is configured to represent a state that the feedback signal is at a high potential.

7. The method as claimed in claim 1, wherein
determining the feedback signal according to the working mode in the first time duration and the detection result comprises: in the case that the working mode in the first time duration is the ICT touch mode or the ICT entry mode and the touch behavior does not exist in the predetermined time duration, controlling the feedback signal to be in a second switching state, the second switching state is used for representing that the feedback signal is switched from the second feedback state to the first feedback state; and controlling the working mode of the touch screen according to the feedback signal comprises: generating a fourth control instruction according to the second switching state, the fourth control instruction is used for controlling the working mode of the touch screen in the predetermined time duration to be the ICT exit mode and the ICT exit mode is used for representing that, after the predetermined time duration ends, the working mode is switched to the ICT single display mode.

8. The method as claimed in claim 1, wherein the first feedback state is configured to represent a state that the feedback signal is at a low potential.

9. A non-transitory storage medium, comprising a stored program, the program executing the method for controlling touch screen as claimed in claim 1.

10. A processor, configured to run a program stored in a memory, the program running to execute the method for controlling touch screen as claimed in claim 1.

11. The method as claimed in claim 1, controlling a working mode of the touch screen according to the feedback signal comprises:
sending the feedback signal to a Timing Controller (TCON) chip, the TCON chip being configured to control a working mode of the touch screen according to the feedback signal.

12. A device for controlling touch screen, comprising:
a touch panel, configured to detect whether a touch behavior exists to generate a detection result;
a driver chip, configured to determine a feedback signal according to the detection result; and
a Timing Controller (TCON) chip, configured to return a touch synchronization signal corresponding to the feedback signal to the driver chip according to the feedback signal, the driver chip controlling a working mode of a touch screen according to the touch synchronization signal;
wherein the working mode comprises: an In-Cell Touch (ICT) single display mode, configured to control the touch screen not to have a touch function; an ICT touch mode, configured to control the touch screen to have the touch function; an ICT entry mode, configured to control the touch screen to be switched from the ICT single display mode to the ICT touch mode; and an ICT exit mode, configured to control the touch screen to be switched from the ICT touch mode to the ICT single display mode;
wherein driver chip is further configured to determine the feedback signal according to the detection result by the program instruction of: acquiring the working mode of the touch screen in a first time duration, the first time duration is a previous time duration of a predetermined time duration where the feedback signal is located; and determining the feedback signal according to the working mode in the first time duration and the detection result determining the feedback signal according to the working mode in the first time duration and the detection result comprises: in a case that the working mode in the first time duration is the ICT single display mode or the ICT exit mode and the touch behavior does not exist in the predetermined time duration, determining that the feedback signal is in a first feedback state; and controlling the working mode of the touch screen according to the feedback signal comprises: generating a first control instruction according to the first feedback state, the first control instruction is used for controlling the working mode of the touch screen in the predetermined time duration to be the ICT single display mode.

* * * * *